United States Patent [19]

Hull et al.

[11] Patent Number: 6,067,206
[45] Date of Patent: May 23, 2000

[54] METHOD AND APPARATUS TO COMPENSATE FOR SERVO WEDGE ROTATIONAL OFFSET AFTER A HEAD SWITCH

[75] Inventors: Richard W. Hull, Laguna Hills; David B. Joan, Trabuco Canyon; Charles R. Patton, III, Murrieta; Vafa James Rakshani, Laguna Beach, all of Calif.; Charles W. Simmons, Phoenix, Ariz.

[73] Assignee: Western Digital Corporation, Irvine, Calif.

[21] Appl. No.: 08/972,655

[22] Filed: Nov. 18, 1997

[51] Int. Cl.⁷ .................................................. G11B 5/596
[52] U.S. Cl. ...................................... 360/77.08; 360/77.02
[58] Field of Search ............................... 360/77.08, 77.02, 360/78.12, 78.06, 77.07, 77.06, 76, 75, 51

[56] References Cited

U.S. PATENT DOCUMENTS

| | | | |
|---|---|---|---|
| 5,109,502 | 4/1992 | Sasamoto et al. | 395/425 |
| 5,901,010 | 5/1999 | Glover et al. | 360/78.12 |
| 5,909,336 | 6/1999 | Schaffner et al. | 360/77.02 X |

*Primary Examiner*—Muhammad Edun
*Attorney, Agent, or Firm*—Milad G. Shara

[57] ABSTRACT

A disk drive controller having a microprocessor and a sampled signal head positioning system measures and stores the relative rotational offsets between heads arranged in a stacked relationship and respective servo wedges on different disk surfaces. The offsets are stored in a table and subsequently applied to a servo wedge detection circuit to ensure that a next sequential wedge is detected after a head switch.

16 Claims, 7 Drawing Sheets

| HEAD | 1 | 2 | 3 | 4 | 5 | 6 |
|---|---|---|---|---|---|---|
| 1 | 0 | OFFSET 1-2 | OFFSET 1-3 | OFFSET 1-4 | OFFSET 1-5 | OFFSET 1-6 |
| 2 | OFFSET 2-1 | 0 | OFFSET 2-3 | OFFSET 2-4 | OFFSET 2-5 | OFFSET 2-6 |
| 3 | OFFSET 3-1 | OFFSET 3-2 | 0 | OFFSET 3-4 | OFFSET 3-5 | OFFSET 3-6 |
| 4 | OFFSET 4-1 | OFFSET 4-2 | OFFSET 4-3 | 0 | OFFSET 4-5 | OFFSET 4-6 |
| 5 | OFFSET 5-1 | OFFSET 5-2 | OFFSET 5-3 | OFFSET 5-4 | 0 | OFFSET 5-6 |
| 6 | OFFSET 6-1 | OFFSET 6-2 | OFFSET 6-3 | OFFSET 6-4 | OFFSET 6-5 | 0 |

METHOD AND APPARATUS TO COMPENSATE FOR SERVO WEDGE ROTATIONAL OFFSET AFTER A HEAD SWITCH

FIELD OF THE INVENTION

The present invention relates to hard disk drives. More particularly, the present invention relates to an embedded servo hard disk drive providing a method and apparatus to compensate for rotational offset between respective servo wedges on different disk surfaces after a head switch.

DESCRIPTION OF THE PRIOR ART AND RELATED INFORMATION

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, in excess of 1 gigabyte per drive. Nevertheless, there exists substantial competitive pressure to develop mass-market hard disk drives having even higher capacities. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, and high capacity requires a design that provides high format efficiency and high areal storage density. Format efficiency relates to the percentage of available area that is available for storing user data rather than being consumed by control data, gaps, etc. Areal storage density relates to the amount of data storage capacity per unit of area on the recording surfaces of the disks. The available areal density may be determined from the product of the track density measured radially and the linear bit density measured along the tracks.

The available track density depends on numerous factors including the performance capability of a servo system in the hard disk drive which, among other things, provides for track following, i.e., maintaining alignment of a reading or writing transducer with respect to the centerline of a desired track. One type of servo system, sometimes referred to as an "embedded servo" employs servo data on the same disk surface that stores user data to provide signals employed in the operation of the servo system. An embedded servo format for the disk surface has the basic characteristic of a plurality of radially-extending servo-data regions (sometimes referred to as "servo wedges") and an interspersed plurality of radially-extending user-data regions. Each user-data region has a plurality of user-data track segments, and each servo-data region has a plurality of servo-data track segments. In accord with another element of an embedded servo format, the servo data include track-identification data used during track-seeking operations, and burst data used during track-following operations. While data are being read in operation of an embedded servo hard disk drive, a transducer produces a time-multiplexed analog read signal that during a revolution of the disk represents servo data during each of a first set of time intervals; and represents user data during each of a second set of time intervals.

The rate at which servo wedges pass under a reading transducer is referred to as the "servo sample rate." The servo sample rate equals the revolution rate of the rotating disk multiplied by the number of servo wedges per surface. A high servo sample rate is desirable for the purpose of providing a robust servo system. On the other hand, increasing the servo sample rate generally involves allocating more surface area to servo wedges and thereby adversely impacts surface format efficiency. In further pursuit of improved format efficiency, contemporary disk drives have attempted to reduce the length of each servo wedge in order to increase the space available for user data segments along a track.

Various methods have been employed to accomplish the aforementioned reduction in servo wedge length including reducing the length of fields in the servo wedge used to "train" automatic gain control (AGC) and phase lock oscillator (PLO) circuits in the disk drive. The disk drive electronics must be able to sample the servo wedge at predictable intervals in order to properly condition the AGC and PLO circuits for reading servo data. The timing of sampling the servo wedge has some uncertainty however, owing to variations in motor speed. Another aspect of this uncertainty is due to real and apparent offsets between respective servo wedges on different surfaces which may become a factor after a head switch.

The offsets between respective servo wedges on different surfaces are rooted in the use of stacked arms carrying read/write transducers in a head stack assembly which forms part of a rotary actuator used to position the transducers over a surface of a disk. Although great care is taken during design and manufacturing of the disk drive, small differences in the relative position of heads on the stacked arms do occur and can be variable during operation of the disk drive due to temperature variations and other mechanical stresses. The disk drive writes the embedded servo format onto a respective track of all surfaces simultaneously during a servowriting process when the drive is manufactured. The offsets between respective transducers during servowriting will result in small offsets between respective servo wedges on each surface. Additional offsets due to mechanical distortion of transducer supporting structures may occur later in the life cycle of the drive when reading the servo wedges.

The offsets can be of two dimensions. One, a radial offset, is expressed as a position error arising from the radial position relationship between each of a pair of stacked transducers and a respective track center passing under the transducer. The second, a rotational offset, is expressed as a timing difference between a reference point in a servo wedge on a reference surface and the same reference point on a respective servo wedge on a destination surface after a head switch. Because servo wedges are sampled on a fixed time interval basis, the rotational offset may cause a loss of servo wedge detection after a head switch. In order to continue operations on the destination surface, the servo controller must then find a servo wedge by searching for an address mark and this can cause the delay of operations until the servo controller achieves stable control on the destination surface.

Radial offsets can be resolved in the normal course of servo seek and track following operations, so long as the servo system can efficiently acquire servo samples. If however, the rotational offset causes delays in reading servo wedges after a head switch, the disk drive may exhibit lower performance. There is a need therefore for an efficient way to acquire servo samples after a head switch.

SUMMARY OF THE INVENTION

The invention provides a disk drive having a sampled signal head positioning servo system, first and second rotating recording surfaces wherein each recording surface has multiple sequentially-active equally spaced-apart servo wedges, first and second heads mounted in a stacked arrangement and disposed over the first and second recording surfaces respectively, and including a processor for controlling disk operations. The disk drive further comprises the first head having a first position over a first servo wedge and the second head having a second position over a second servo wedge. A means for providing a value representing a rotational offset between the first position and the second position and a means for detecting a servo wedge including a timing means programmable by the processor is further provided to establish a window for reading the servo wedge. After a head switch from the first head to the second head the processor applies the rotational offset value to the timing means to establish a window for reading a servo wedge on the second recording surface.

In a preferred embodiment, the means for providing a rotational offset value comprises a table of offset values including offset values for a plurality of zones and for all surfaces.

Preferably the means for detecting a servo wedge includes a means for detecting a servo sync mark and the timing means includes a timer providing a count of clock pulses. When a servo sync mark is detected, the timer count is further preferably stored in a register readable by the processor and the timer is reset.

In another aspect, the invention may described as a method for determining a rotational offset between first and second heads disposed in a stacked arrangement and respective servo wedges on first and second recording surfaces in a disk drive having a sampled signal servo system. The comprises the steps of detecting a servo wedge on the first surface using a servo wedge timing mode; setting a timer to start when the first surface servo wedge is detected; performing a head switch to the second surface; detecting a next respective servo wedge on the second surface using a servo wedge timing mode; stopping the timer when the second surface wedge is detected; storing the timer value; and converting the timer value to a rotational offset value.

In a preferred embodiment, the step of detecting a servo wedge includes detecting a servo sync mark. Preferably, the servo wedge timing mode comprises the step of setting a fixed time interval for sampling the servo wedge.

The step of detecting a next respective servo wedge using a servo wedge timing mode further preferably comprises the step of iteratively adjusting a sampling interval until the servo wedge is detected.

DETAILED DESCRIPTION

Figure 1:
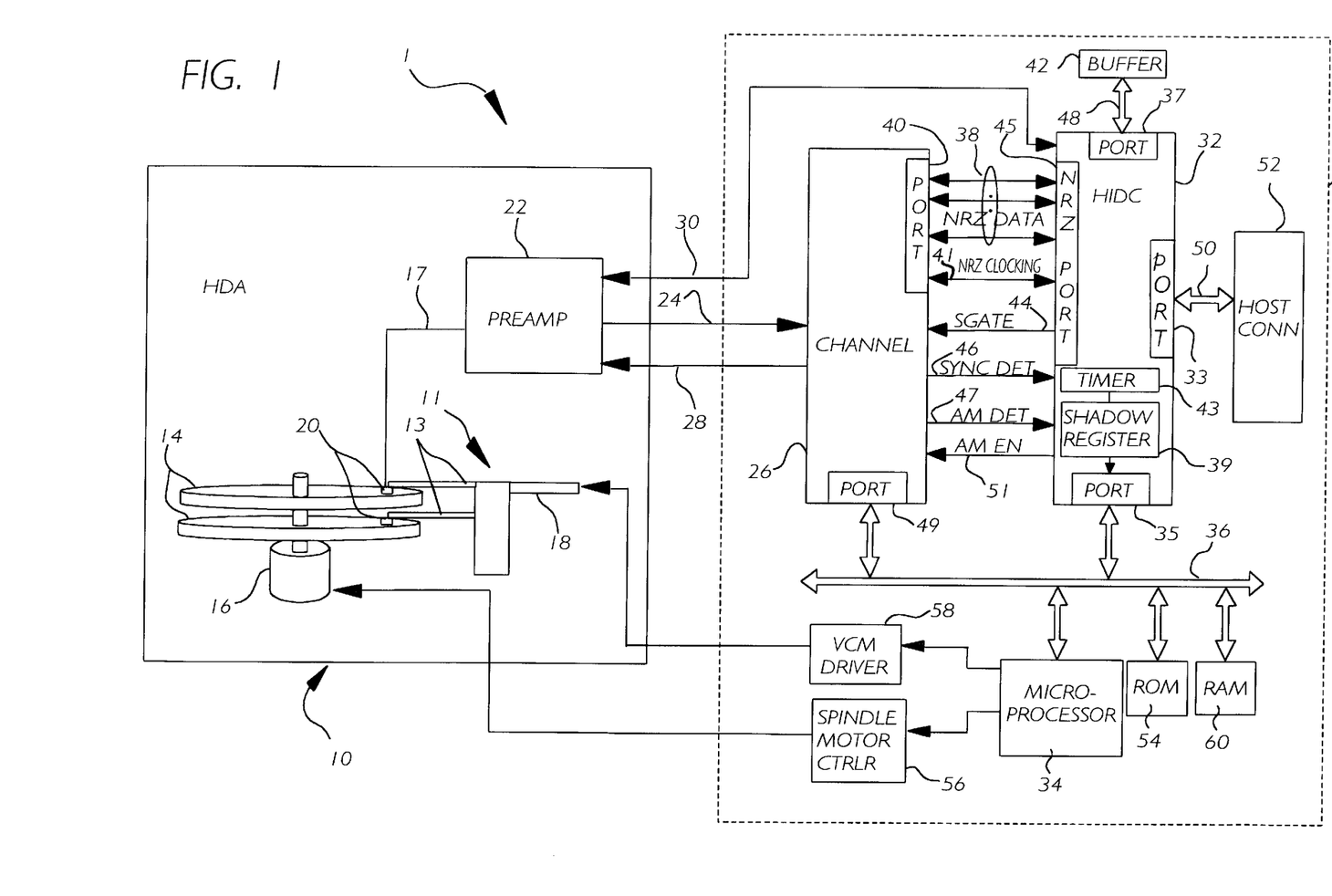
FIG. 1 is a block diagram of a disk drive of the invention.

Referring to FIG. 1, a disk drive 1 of the invention has a head disk assembly (HDA) 10 and a controller 12 including a sampled signal head positioning system. HDA 10 includes a head stack assembly 11 comprising coil 18 and arms 13 supporting transducer heads 20 in a stacked arrangement. Transducer heads 20 are disposed over disks 14 for recording and reproducing servo and user data on the disks 14. Coil 18 and one or more magnets (not shown) forms a portion of a voice coil motor for rotatably positioning heads 20 over disks 14. Disks 14 are caused to spin at a constant rate by spindle motor 16. Preamplifier 22, connected to heads 20 by data path 17, amplifies magnetic transition signals read from any of disks 14 and drives signals for writing transitions to any of disks 14. Preamplifier 22 is connected to controller 12 to convey read signal 24 to channel 26 and write signal 28 from channel 26. Control signal path 30 from Host Interface and Disk Controller (HDC) 32 provides for selection of a particular head 20 to be amplified by preamplifier 22 when data on a particular disk 14 surface is desired. This selection process when switching from one head 20 to another is known as a "head switch."

For read operations, channel 26 has signal conditioning circuitry, including AGC and PLO circuits, which provide for the conversion of magnetic transition signals from preamplifier 22 into NRZ (non-return to zero) data symbols 38 accompanied by an NRZ clock 41 derived from the signals. During write operations the process is reversed with HDC 32 providing NRZ data and a clock 41 to channel 26. NRZ data 38 and NRZ clock 41 are connected to NRZ port 40 in channel 26 and NRZ port 45 in HIDC 32. In a preferred embodiment, channel 26 has circuitry for processing both servo and user data. The invention may be practiced with other functional partitions including having external servo circuitry connected to channel 26.

Servo circuitry in channel 26 reads servo data when enabled by signal SGATE 44 from HIDC 32. Reading valid servo data results in channel 26 providing signal SYNC DET 46. HIDC 32 provides signal AM EN 51 to channel 26 to enable an address mark detection mode. When channel 26 detects a valid address mark, signal AM DET 47 is provided to HIDC 32. The operation of channel 26 servo circuitry and the above servo signals are discussed in more detail below.

HIDC 32 provides centrally integrated logic circuits to provide disk controller, host interface controller, and buffer memory controller functions. NRZ port 45 provides for transfer of NRZ symbols to and from channel 26. Buffer memory port 37 provides for data transfer to and from buffer memory 42 through memory bus 48 for caching of read and write data. Host interface port 33 connects to host interface bus 50 and host connector 52 for transfer of commands, status and data between the disk drive 1 and a host computer (not shown). Microprocessor port 35 connects microprocessor 34 to functional registers within HIDC 32 via microprocessor bus 36.

HIDC 32 provides conventional disk controller circuitry including programmable timing means such as clock circuitry and registers to define a servo sampling interval. HDC 32 also provides timer 43 and shadow register 39 used in practicing the invention as described in more detail below. Generally, timer 43 counts clock pulses to provide a time reference and shadow register 39 stores the count reached by timer 43.

Microprocessor 34 executes control programs for disk drive 1 using ROM 54 and RAM 60 in a conventional manner. Microprocessor 34 maintains constant spin speed of disks 14 by providing commands to spindle motor controller 56. Servo control firmware executed by microprocessor 34 controls the position of heads 20 over disks 14 by commanding control effort through VCM driver 58 based on sampling servo wedges to determine a position error signal. As is well known in the art, servo control may be executed in a separate processor such as a digital signal processor (DSP). The invention may be practiced in either single or dual processor embodiments. Microprocessor 34 controls parameters in channel 26 by providing register setting data on microprocessor bus 36 to port 49 in channel 26.

Figure 2:
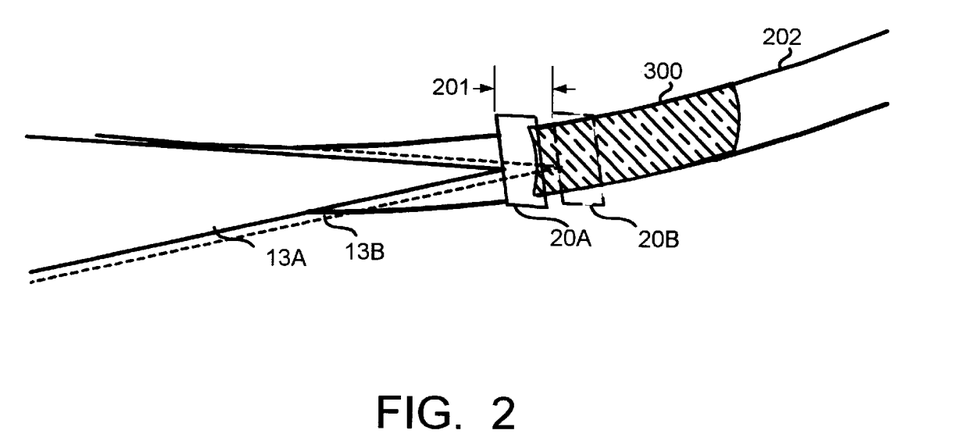
FIG. 2 shows a longitudinal displacement between stacked heads and their corresponding positions over respective servo wedges which produces a rotational offset.

Now turning to FIG. 2, each surface of each disk 14 has a plurality of concentric tracks 202 each of which has a plurality of equally spaced apart servo wedges 300 along the track 202. One track 202 and one servo wedge 300 is shown. In a perfectly aligned stacked arrangement of disks 14 and arms 13, each respective track 202 would be aligned and each respective servo wedge 300 would be aligned. A rotational offset 201 can occur however when there is a longitudinal shift between a reference arm 13A having attached head 20A and any of the other arms in head stack 11 as illustrated by the dotted line next surface arm 13B and next surface head 20B. The relative positions of head 20A and 20B results in the rotational offset 201.

There may be multiple factors contributing to a longitudinal shift causing offset 201. In some embodiments small displacements may be created due to thermal differences between material in arms 13 and a central portion of head stack 11 where arms 13 are attached. Another potential cause is the force applied to head stack 11 during servowriting which may result in unequal longitudinal displacement of the arms. Other thermal and stress variations during operation of the disk drive may also contribute to longitudinal offset. In earlier disk drives, these variations were relatively small in proportion to the length of the fields in the servo wedge and therefore not as critical a consideration. However, in current disk drives the demand for increasing storage capacity has caused designers to minimize the length of the servo wedge which in turn has increased the potential impact of rotational offset 201.

Figure 3:
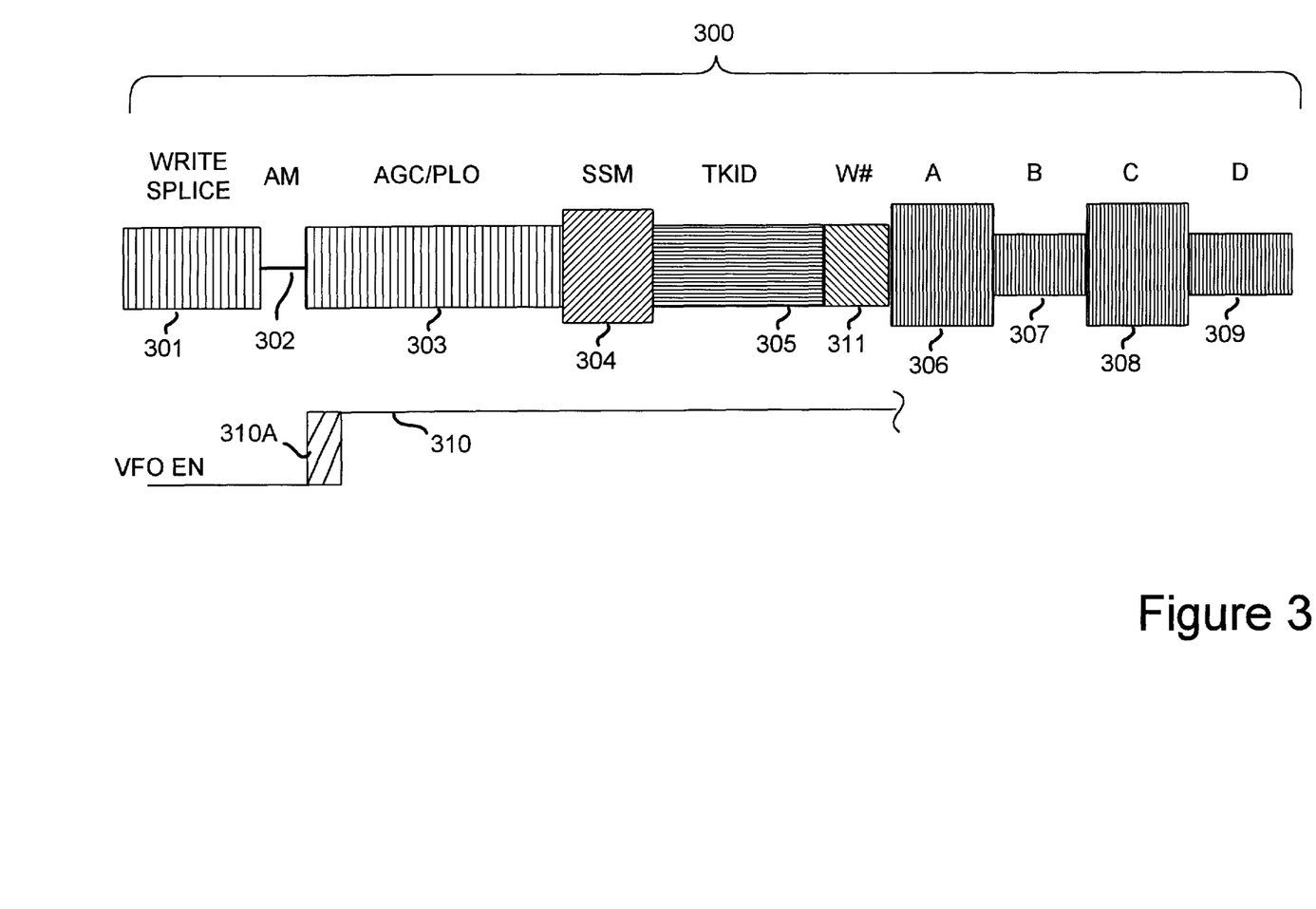
FIG. 3 is a diagram of the fields in an embedded servo wedge and the relationship of the VFO Enable signal to the wedge.

This impact is further illustrated in FIG. 3 where a servo wedge 300 used with the invention is shown. The various components of servo wedge 300 are not drawn to scale, therefore actual relative dimensions will vary significantly. Servo wedge 300 comprises a sequence of fields having various functions relative to reading servo data. Write splice or setup field 301 provides a buffer zone following a preceding user data segment which is written to prevent an erasure being erroneously detected as an address mark. Address mark field AM 301 provides a uniquely modulated segment which allows for detection of a servo wedge. Typically AM 301 is created by a dc erase of the segment. AGCIPLO field 303 provides a stable reference to set the gain of the channel and "train" a phase lock oscillator to lock on the servo channel frequency. Servo sync mark SSM 304 field provides a uniquely coded word which synchronizes decoding logic in channel 26 and HIDC 32 to byte or word timing boundaries. Track identification field TKID 305 provides a coded binary address of the track. Conventionally a gray code is employed to allow for reading track identification fields during seek operations. W# field 311 identifies the sequence number of each wedge in the sequence of wedges spaced around the track. Servo burst fields 306–309 are used in a conventional manner to provide fine position information during track following operations.

In order to improve format efficiency and therefore provide higher user data capacity in the disk drive, it is desirable to reduce the overall length of the servo wedge by shortening the length of individual fields. Shortening the overall length of the servo burst fields 306–309 offers a very limited solution because of the need to integrate the bursts for accurate position information. Increasing the frequency at which the servo data is recorded is recorded is another way of shortening the servo wedge. A significant opportunity lies in decreasing the length of AGC/PLO field 303 however there are potential problems as described below which are overcome by the invention.

There are conventionally two modes of operation for servo circuitry used to read the servo wedge—a so-called "soft sector" mode and a so-called "hard sector" mode. In the soft sector mode, HIDC 32 asserts the signal AM EN 51 which enables channel 26 to begin searching for the unique address mark AM 302. When an address mark is detected, the signal AM DET 47 is asserted by channel 26 notifying HIDC 32 of the detection. Preferably HIDC 32 qualifies the detection of AM 302 with the signal SGATE 44 to activate the servo detection circuitry in channel 26. The detection of AM 302 during an active SGATE 44 period indicates that a servo wedge 300 has been found and the remainder of the servo wedge 300 fields may be processed. Preferably when servo sync mark SSM 304 is detected, the hard sector mode is entered by deasserting AM EN 51. In the hard sector mode, a precisely timed sampling of servo wedges is implemented by setting timer 43 to an interval which is calibrated for the particular zone or band of tracks being accessed. The timer is reset at each SSM 304 detection and re-initialized to the appropriate interval. In this manner each wedge is read at a predetermined time interval. The hard sector mode is preferred over soft sector mode because it is more precise and reliable. Soft sector mode is generally reserved for the case where the window for reading a servo wedge is unknown.

The reading of servo data in servo wedge 304 depends on achieving PLO synchronization by reading AGC/PLO field 303. Internal signal VFO EN 310 in channel 26, driven by the interval established in hard sector mode, is asserted to enable the phase lock oscillator to lock on AGC/PLO field 303. The timing of asserting VFO EN 303 is critical because if asserted too early, the PLO might start locking on the AM 302 field which could drive the PLO significantly off the target frequency and therefore not achieve frequency lock in time to read the servo data. Alternatively, if asserted too late, VFO EN 310 might not allow the PLO a sufficient number of cycles to lock on the servo data frequency. This window of uncertainty (too early to too late) is illustrated by variable period 310A. The length of uncertainty is affected by motor speed variations and other factors, including the problem of rotational offset as mentioned above.

When AGC/PLO field 303 is relatively long, the uncertainty is not a large factor because it is small in proportion to the entire field. However in current disk drives where a competitive advantage can be realized by reducing the length of AGC/PLO field 303, the uncertainty can be critical. In particular, after a head switch occurs, the rotational offset 201 may cause the next servo wedge on the destination surface to be misread because the hard sector mode interval, which triggers VFO EN 310, was set to the interval established for the previous surface. Even though the interval between wedges on the destination surface is the same as the reference surface, the rotational offset 201 may cause a timing error which exceeds the margin of error for asserting VFO EN 310.

Figure 4:
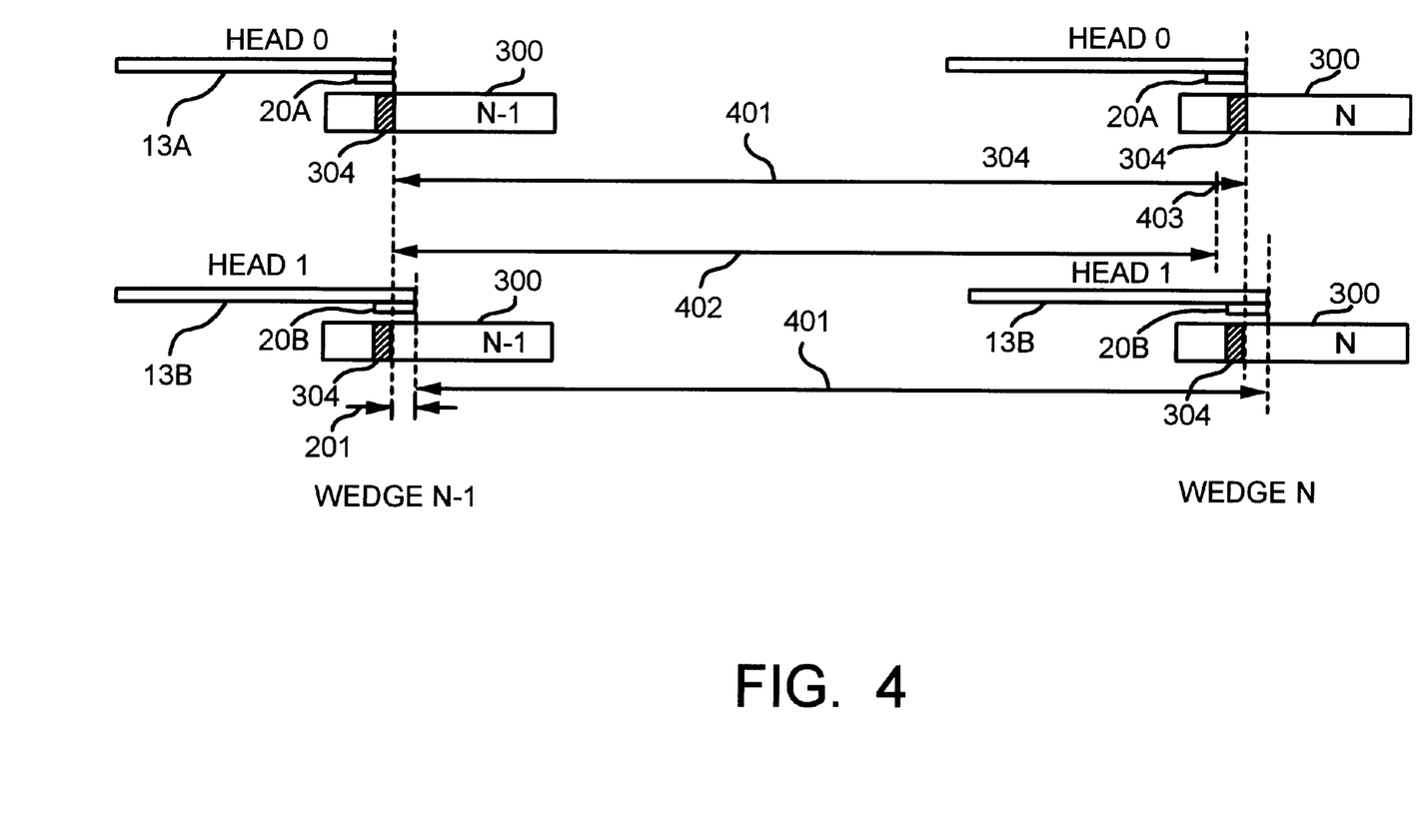
FIG. 4 is a diagram of the rotational offset between heads on different surfaces and respective servo wedges illustrating how the apparent offset can create an error in the sampling window.

FIG. 4 shows a further illustration of the rotational offset problem. Two servo wedges 300 on each of two surfaces are shown. The N-I wedges 300 will pass under heads 20A and 20B first, followed by the N wedges 300. Note that a longitudinal offset exists between head 20A and 20B such that a corresponding rotational offset 201 exists. An interval 401 is established for sampling servo wedges 300 on the first surface with head 20A. Note further that the same interval 401 exists between servo wedges on the second surface sampled by head 20B. A problem occurs when head 20A samples the N-I servo wedge 300 and the servo controller performs a head switch to head 20B. The sampled servo system expects to read SSM 304 at the end of interval 401, however because of the rotational offset, head 20B will see the servo wedge sooner. The shorter interval is indicated by 402. The earlier point of coincidence in interval 401 is indicated by 403. The offset therefore creates a shift in the sampling interval timebase that prevents reading servo wedges until the servo controller compensates for the shift. Conventionally the servo controller would respond to the loss of a detected servo wedge by returning to the soft sector mode to find a servo wedge and suffer a delay until operations can resume on the destination surface after a head switch. The invention allows the offset to be compensated in a more efficient manner which preserves disk drive performance.

Figure 5:
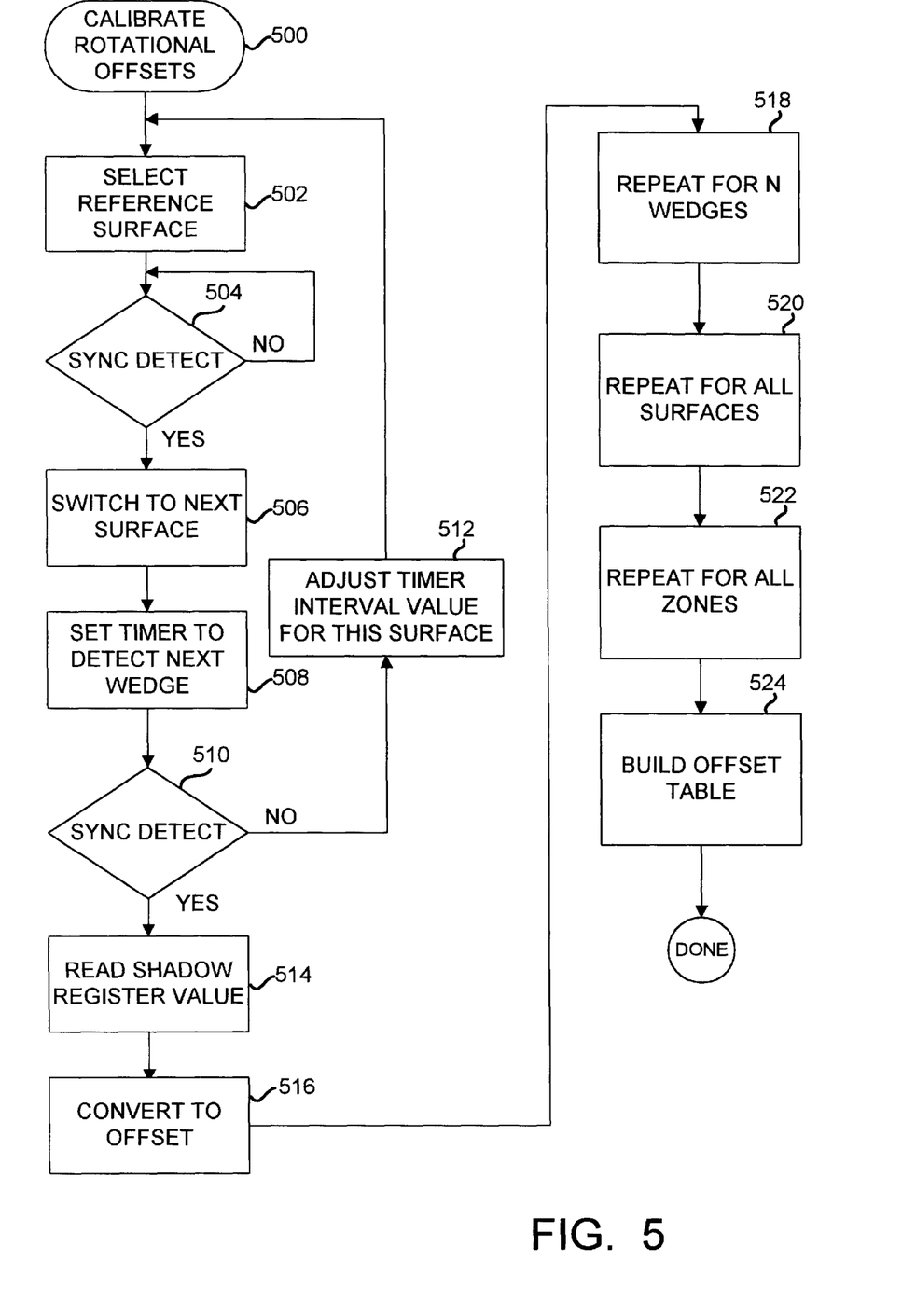
FIG. 5 is a flow chart of the method of the invention to calibrate the rotational offsets between respective servo wedges on different surfaces of the disk drives and build a table of offsets therefrom.

In FIG. 5, the method of the invention to calibrate rotational offsets 500 is illustrated. At 502, a reference surface is selected and the predetermined interval is established in hard sector mode. At 504, the routine waits for detection of SSM 304 to establish the start of the wedge interval. At 506, a head switch is performed to a next (destination) surface. At 508 the timer is set to the expected interval to the next wedge. At 510 the routine checks for SSM 304 detection. If the detection fails, the interval value for the destination surface (after a head switch) is adjusted at 512. A head switch is performed to re-select the reference surface at 502 and the loop continues until a SSM 304 is detected at 510. The interval adjustment process at 512 may be practiced in a variety of ways. Preferably a search mode is applied using a series of increasing positive and negative variations around the nominal time to find the optimum interval. At 514 after SSM 304 detection, shadow register 39 is read. The value in shadow register 39 at this point represents the interval shown as 403 in FIG. 4 i.e. the interval which reflects the offset. At 516, the value from shadow register 39 is converted to an offset which may be stored and retrieved when a head switch occurs. The calibrated offset is tested by repeating the steps of alternating between the reference surface and switching to the destination surface for N wedges at 518 where N is an experimentally determined number providing an assurance that a valid offset has been stored. The process from 502 to 518 is repeated for all required surfaces at 520. The process from 502 to 520 is then repeated at 522 for all each required zone. At 524, an offset table is constructed from the stored values acquired at step 516 for each zone of each surface. The number of zones to be tested is determined experimentally and can be reduced by applying a zone factor which scales the intervals according to the radial position of a specific track.

Figure 6:
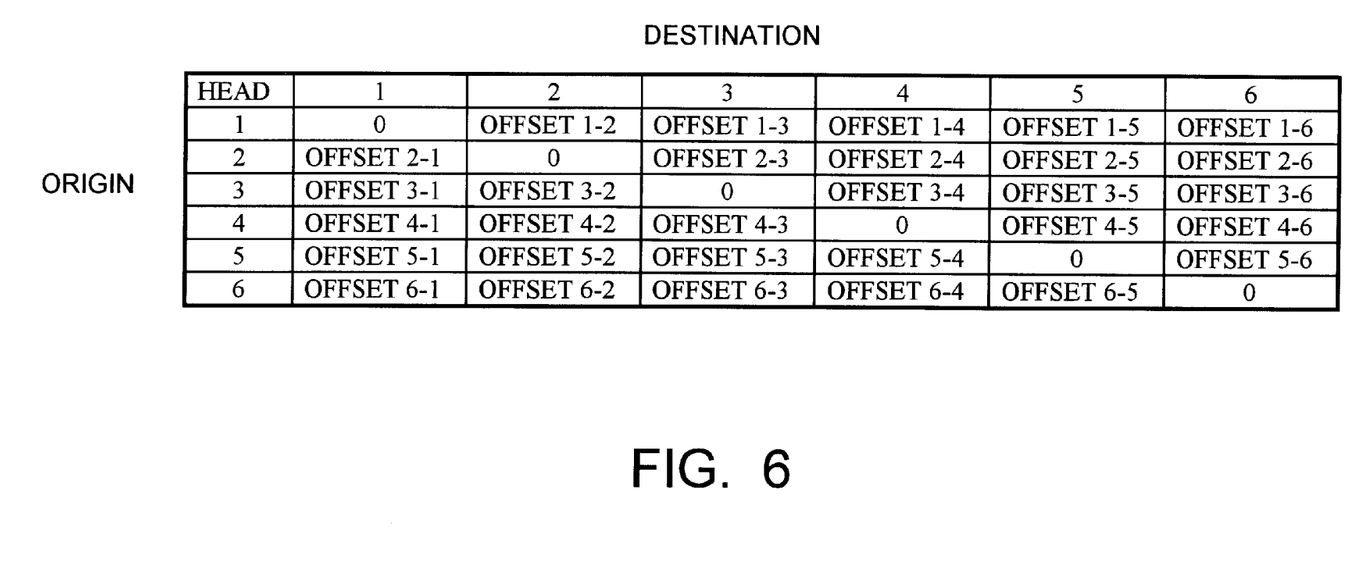
FIG. 6 is an offset table of the invention storing the relative rotational offsets between a reference track on a reference surface and a destination track on a destination surface.

FIG. 6 shows one embodiment of an offset table of the invention. For each originating head i.e. reference head, there is a corresponding destination head offset value entry in the table representing a rotational offset 201 which can be applied after the head switch occurs. The single table can be easily expanded to store offset values for each zone or multiple tables can be stored where each table represents a zone. In addition, the number or size of tables can be reduced by applying a radial factor to a table value.

Figure 7:
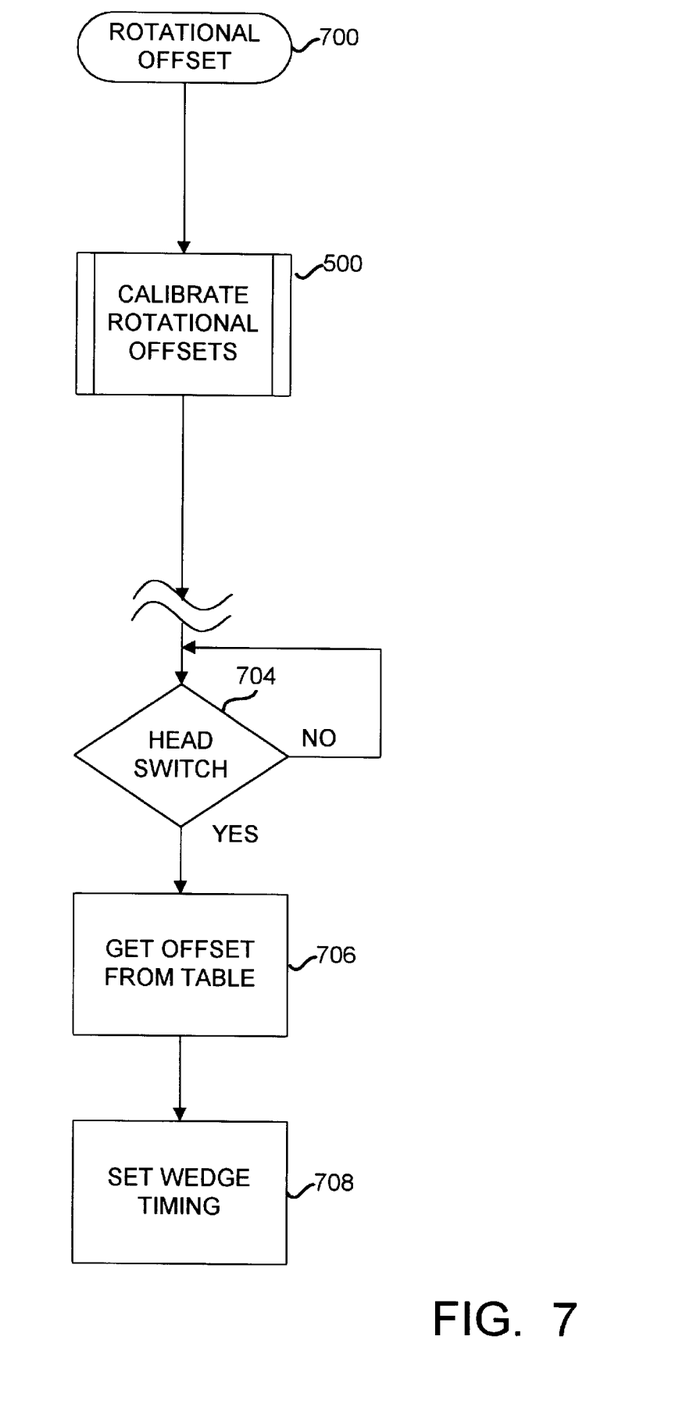
FIG. 7 is flow chart of the method of the invention to calibrate the rotational offsets and build a rotational offset table, and apply the offsets from the table after a head switch.

FIG. 7 is a flowchart of the invention which shows the overall acquisition of offsets and the application of the offset table. The rotational offset process 700 begins at 500 where the rotational offsets are calibrated as previously described for FIG. 5 and the offset table of FIG. 6 is constructed. Preferably, the rotational offset calibration process 500 is performed at each disk drive power-up. After normal drive operation proceeds and as each head switch is performed thereafter at 704, at 706 the offset corresponding to the head switch is read from the table of FIG. 6 and the wedge timing to the next servo wedge on the destination surface is set at 708.

Thus a method and apparatus for efficiently compensating for servo wedge rotational offset after a head a switch has been disclosed.

We claim:

1. A disk drive having a sampled signal head positioning servo system, first and second rotating recording surfaces wherein each recording surface has multiple sequentially-active equally spaced-apart servo wedges, first and second heads mounted in a stacked arrangement and disposed over the first and second recording surfaces respectively, and including a processor for controlling disk operations, the disk drive further comprising:

the first head having a first position over a first servo wedge;

the second head having a second position over a second servo wedge;

a means for providing a value representing a rotational offset between the first position and the second position;

a means for detecting a servo wedge including a timing means programmable by the processor, to establish a window for reading the servo wedge; and after a head switch from the first head to the second head the processor applying the rotational offset value to the timing means to establish a window for reading a servo wedge on the second recording surface.

2. The disk drive of claim 1 wherein the means for providing a rotational offset value comprises a table of offset values.

3. The disk drive of claim 2 wherein the table includes offset values for a plurality of zones.

4. The disk drive of claim 3 wherein the table includes offset values for all surfaces.

5. The disk drive of claim 1 wherein the means for detecting a servo wedge includes a means for detecting a servo sync mark.

6. The disk drive of claim 5 wherein the timing means includes a timer.

7. The disk drive of claim 6 wherein the timer provides a count of clock pulses.

8. The disk drive of claim 7 wherein the timer count is stored in a register when the servo sync mark is detected.

9. The disk drive of claim 8 wherein the register is readable by the processor.

10. The disk drive of claim 7 wherein the timer is reset by the detection of the servo sync mark.

11. In a disk drive having a sampled signal servo system, first and second recording surfaces, and first and second heads disposed in a stacked arrangement over the recording surfaces, a method for determining a rotational offset between the first and second heads and respective servo wedges on the first recording and second recording surfaces, the method comprising the steps of:

a) detecting a servo wedge on the first surface using a servo wedge timing mode;

b) setting a timer to start when the first surface servo wedge is detected;

c) performing a head switch to the second surface;

d) detecting a next respective servo wedge on the second surface using a servo wedge timing mode;

e) stopping the timer when the second surface wedge is detected;

f) storing the timer value; and g) converting the timer value to a rotational offset value.

12. The method of claim 11 wherein the detection of a servo wedge comprises the detection of a servo sync word.

13. The method of claim 11 wherein the servo wedge timing mode comprises the step of setting a fixed time interval for sampling the servo wedge.

14. The method of claim 11 wherein the step (d) of detecting a next respective servo wedge using a servo wedge timing mode further comprises the step of iteratively adjusting a sampling interval until the servo wedge is detected.

15. A disk drive having a sampled signal head positioning servo system, first and second rotating recording surfaces wherein each recording surface has multiple sequentially-active equally spaced-apart servo wedges on the corresponding recording surface, first and second heads mounted in a stacked arrangement and disposed over the first and second recording surfaces respectively, the first head having a first position over a first servo wedge, the second head having a second position over a second servo wedge, and including a processor for controlling disk operations, the disk drive further comprising:

a circuit to measure and store a rotational offset between the first position and the second position; and a circuit to read the servo wedge after a head switch from the first head to the second head in which the processor applies the measured and stored rotational offset value corresponding to the first position and the second position in order to establish a window for reading a servo wedge on the second recording surface.

16. In a disk drive having a sampled signal servo system, first and second recording surfaces, and first and second heads disposed in a stacked arrangement over the recording surfaces, a method for determining a rotational offset between the first and second heads and respective servo wedges on the first recording and second recording surfaces, the method comprising:

detecting a servo wedge on the first surface;

performing a head switch to the second surface;

detecting a next respective servo wedge on the second surface;

generating a rotational positional offset from the detection of the servo wedge on the first surface and the detection of the servo wedge on the second surface; and storing the rotational positional offset for subsequent use during head switches when reading the first and second surfaces.

* * * * *